United States Patent
Wang et al.

(10) Patent No.: US 12,442,401 B2
(45) Date of Patent: Oct. 14, 2025

(54) CLAMPING DEVICE FOR CONNECTING BICYCLE RACK TO BICYCLE

(71) Applicant: KING RACK INDUSTRIAL CO., LTD., Taichung (TW)

(72) Inventors: Chiu Kuei Wang, Taichung (TW); Hugues Espesset, Taichung (TW); Frederic Girod, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 456 days.

(21) Appl. No.: 17/720,161

(22) Filed: Apr. 13, 2022

(65) Prior Publication Data
US 2022/0349433 A1    Nov. 3, 2022

(30) Foreign Application Priority Data

Apr. 28, 2021    (TW) .................................. 110204728

(51) Int. Cl.
| | | |
|---|---|---|
| *F16B 2/10* | (2006.01) | |
| *B62H 5/00* | (2006.01) | |
| *F16B 7/04* | (2006.01) | |

(52) U.S. Cl.
CPC ............. *F16B 7/0493* (2013.01); *B62H 5/00* (2013.01); *F16B 2/10* (2013.01); *Y10T 403/7105* (2015.01)

(58) Field of Classification Search
CPC ....... F16B 2/10; B62H 5/00; Y10T 403/7105; Y10T 403/591
See application file for complete search history.

(56) References Cited

U.S. PATENT DOCUMENTS

| | | | |
|---|---|---|---|
| 7,351,000 B2 * | 4/2008 | Meggiolan ............. | B62K 25/02 301/124.2 |
| 10,174,773 B2 * | 1/2019 | Wang ....................... | B62H 3/02 |

FOREIGN PATENT DOCUMENTS

| | | | | |
|---|---|---|---|---|
| GB | 2195699 A | * | 4/1988 | ................ F16B 2/10 |
| KR | 101137148 B1 | * | 4/2012 | ............. A01D 34/68 |

* cited by examiner

*Primary Examiner* — Michael P Ferguson
(74) *Attorney, Agent, or Firm* — Che-Yang Chen; Law Office of Michael Chen

(57) ABSTRACT

A clamping device for connecting a bicycle rack to a bicycle includes a first clamp, a second clamp and a bar. Two ends of the bar respectively extend through the first and second parts. The second clamp includes a first part and a second part. The second part includes a first engaging portion formed to the outside thereof. The first engaging portion includes a recess and multiple first teeth formed to the inner periphery of the recess. A block is partially engaged with the recess and connected to a connection end of one of the two ends of the bar that protrudes beyond the second part. The block includes a second engaging portion which is engaged with the recess and includes second teeth which are engaged with the first teeth so that the block is not freely rotated relative to the second clamp.

4 Claims, 8 Drawing Sheets

CLAMPING DEVICE FOR CONNECTING BICYCLE RACK TO BICYCLE

BACKGROUND OF THE INVENTION

1. Fields of the Invention

The present invention relates to a clamping device for connecting a bicycle rack to a bicycle.

2. Descriptions of Related Art

The conventional clamping device for connecting a bicycle rack to a bicycle known to applicant is disclosed in Taiwanese Utility Model M471414 and includes a first clamp, a second clamp and a bar connected between the first and second clamps. The first clamp is secured to a bicycle frame, and the second clamp is secured to a bicycle rack. The second clamp includes a room formed between two first clamp parts thereof, and a plastic is engaged with inside of the room so as to clamp the bicycle frame in the room. The bar extends through the first clamp and includes a threaded section which protrudes beyond one side of the first clamp. A nut is threaded to the threaded section of the bar. However, when rotating the nut to tighten or loosen the bar, the first clamp, the tube and the second clamp are co-rotated. Therefore, the user has to hold the first clamp and the second clamp to tighten or loosen the bar, and this is insufficient and wastes time.

The present invention intends to provide a clamping device for connecting a bicycle rack to a bicycle to eliminate the shortcomings mentioned above.

SUMMARY OF THE INVENTION

The present invention relates to a clamping device for connecting a bicycle rack to a bicycle, and the clamping device comprises a first clamp, a second clamp and a bar. Two ends of the bar respectively extend through the first and second parts. The second clamp is a C-shaped clamp and includes a first part and a second part, and a C-shaped space is formed between the first and second parts. The second part includes a first engaging portion formed to the outside thereof. The first engaging portion includes a recess. Multiple first teeth extend radially inward from the inner periphery of the recess. The bar extends through the first part, the C-shaped space and the second part. A block is partially engaged with the recess and connected to one of the two ends of the bar that protrudes beyond the second part and includes a connection end. The block includes a second engaging portion which includes an extension section facing the second part. The extension section is engaged with the recess and includes second teeth which are engaged with the first teeth so that the block is not freely rotated relative to the second clamp.

Preferably, each of the first and second teeth includes a curved face formed to a peak thereof.

Preferably, there are eight first teeth and eight second teeth.

Preferably, the connection end of the bar is a V-shaped end. The block includes a hole in which the connection end is received so as to connect the connection end to the block.

Preferably, the connection end of the bar is a V-shaped end, and the connection end is integrally enclosed by the block.

The advantages of the present invention are that when the locking member is rotated to tighten or loosen the bar, the engagement between the first and second teeth prevents the block and the bar from co-rotating, so that the rotation of the locking member is threadedly movable relative to the bar.

The clamping device of the present invention includes a spring which provides a resilient pushing force to the second clamp to quickly engage the first teeth with the second teeth.

The curved faces of each of the first and second teeth allow the first teeth to be engaged with the second teeth even when the bar is slightly rotated.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
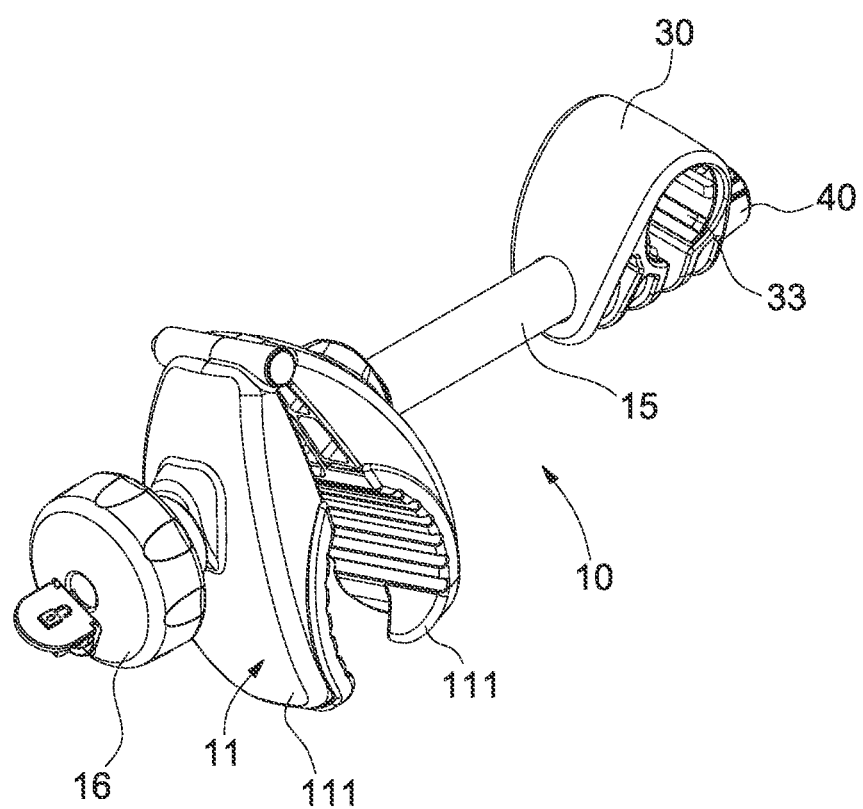
FIG. 1 is a perspective view to show the clamping device of the present invention.
Figure 2:
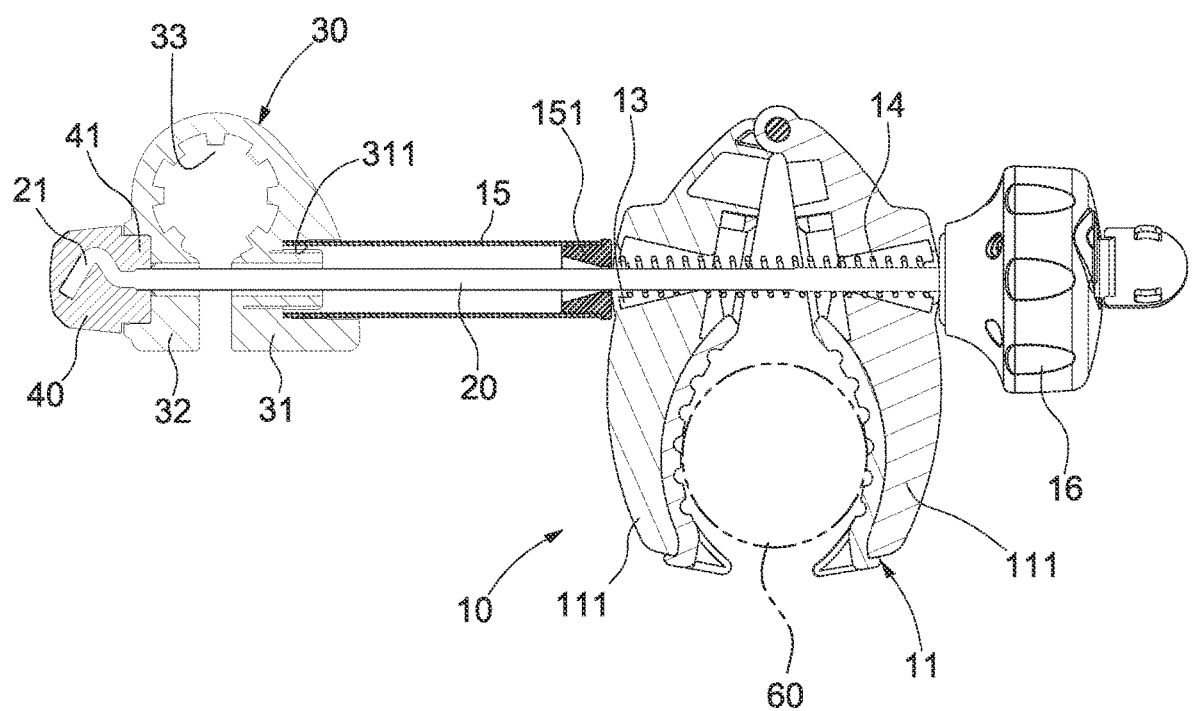
FIG. 2 is a cross sectional view to show the clamping device of the present invention.

Referring to FIGS. 1 and 2, the clamping device 10 of the present invention comprises a first clamp 11 for being connected to a bicycle frame 60 as shown in FIG. 2, a second clamp 30 for being connected to a bicycle rack (not shown), and a bar 20 connected between the first and second clamps 11, 30. Two ends of the bar 20 respectively extend through the first and second clamp 11, 30.

The first clamp 11 includes two clamp parts 111 which are pivotably connected to each other. A passage 13 is formed through the first clamp 11. A spring 14 is located in the passage 13. A tube 15 is mounted to the bar 20 and located between the first and second clamps 11, 30. An end piece 151 is inserted into one of two ends of the tube 15 and contacts one end of the spring 14. Another one of the two ends of the tube 15 is inserted into the second clamp 30. The bar 20 is a threaded bar, a block 40 is connected to one of the two ends of the bar 20 that protrudes beyond the second clamp 30. The bar 20 extends through the tube 15, the passage 13. Another one of the two ends of the bar 20 extends beyond the first clamp 11 and is threadedly connected to a locking member 16. By rotating the locking member 16, the bar 20 is moved so as to control the first clamp 11 to secure or to release the bicycle frame 60.

As shown in FIGS. 2, 3, 4 and 8, the second clamp 30 is a C-shaped clamp and includes a first part 31 and a second part 32 which is integrally formed to the first part 31 so as to form a C-shaped space 33 between the first and second parts 31, 32. The first part 31 includes an annular groove 311 formed to the outside thereof so that the tube 15 is inserted into the annular grieve 311. The second part 32 includes a first engaging portion 34 formed to the outside thereof. The first engaging portion 34 includes a recess 341, and multiple first teeth 35 extend radially inward from the inner periphery of the recess 341. A path 36 is formed through the first part 31, the second part 32, the C-shaped space 33 and the recess 341, so that the bar 20 extends through the path 35.

Figure 4:
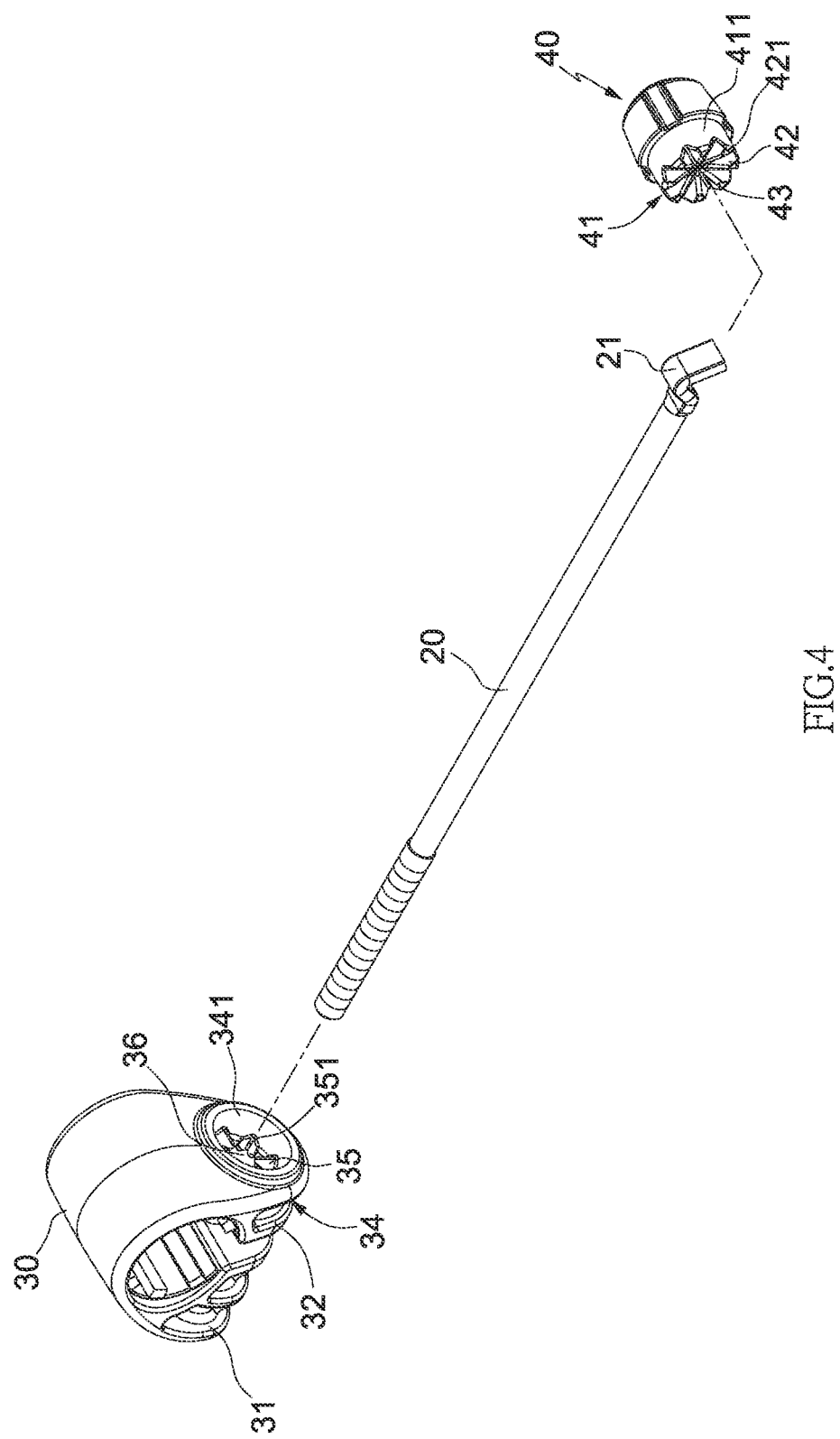
FIG. 4 is an exploded view of the clamping device of the present invention.
Figure 5:
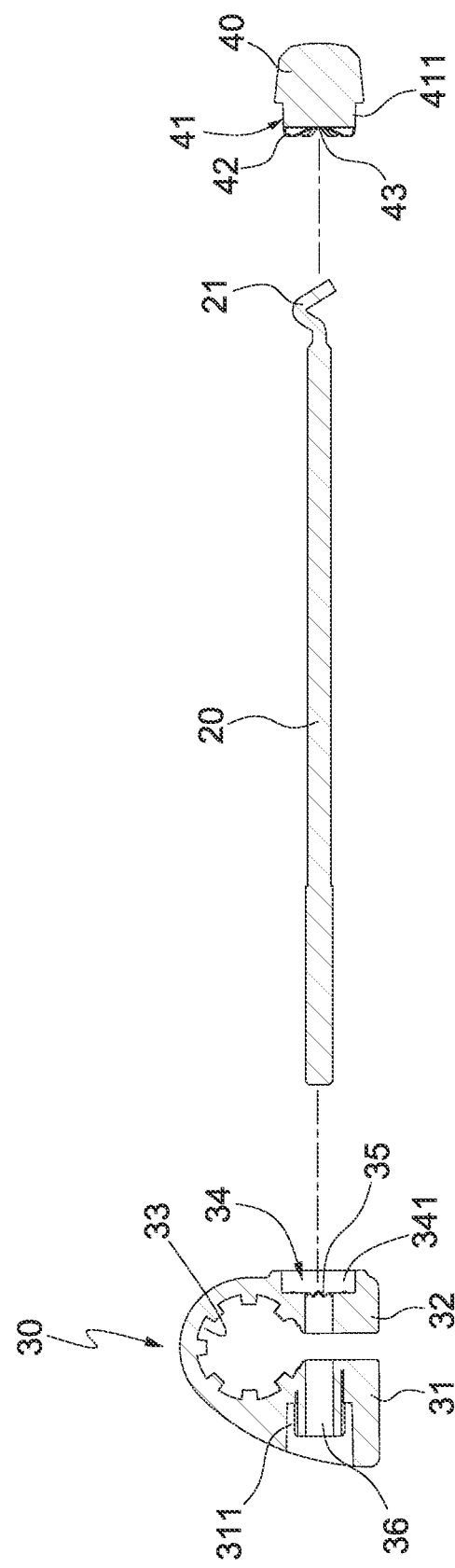
FIG. 5 is a cross sectional view of the parts shown in FIG. 4.
Figure 6:
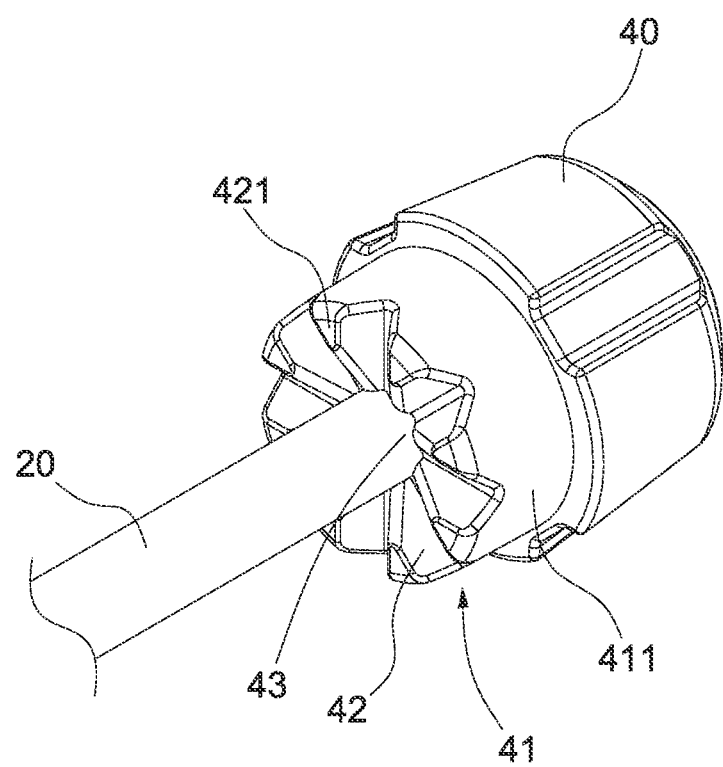
FIG. 6 shows the block and the bar of the clamping device of the present invention.
Figure 7:
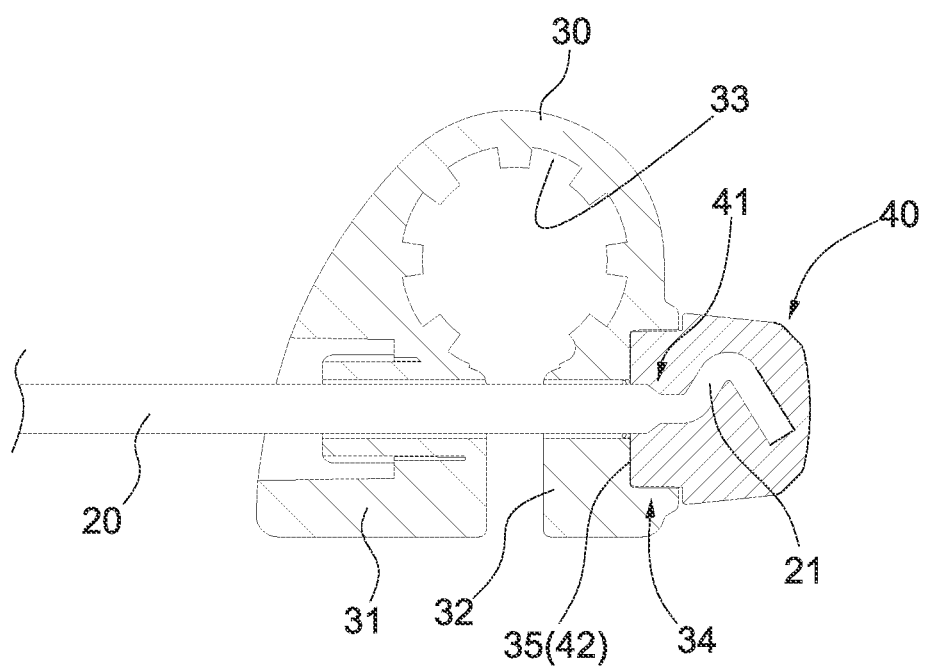
FIG. 7 is a cross sectional view of the parts shown in FIG. 6.
Figure 8:
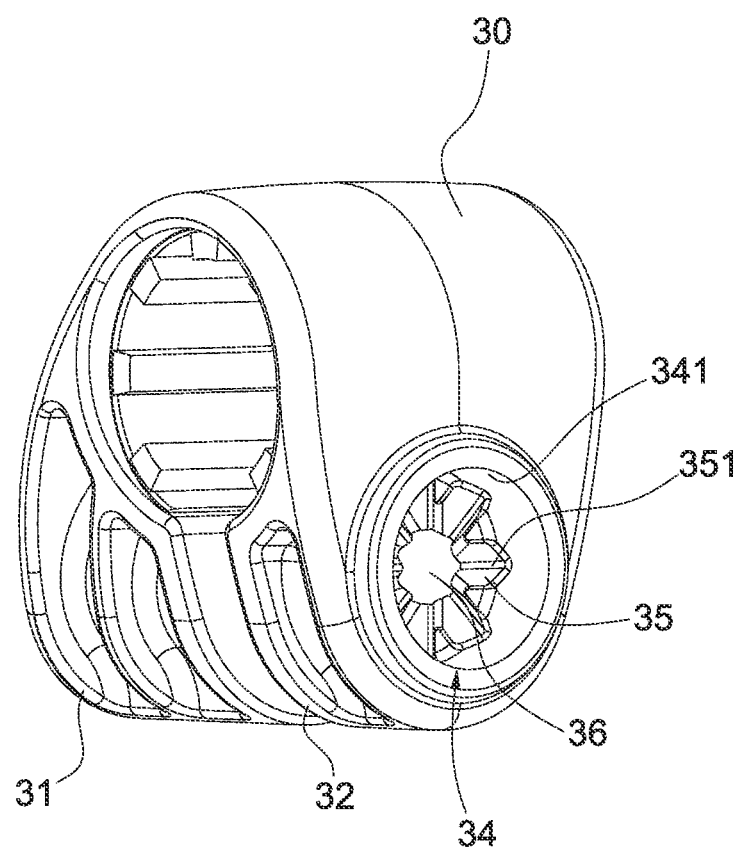
FIG. 8 is a perspective view to show the first teeth in the recess of the second clamp.

As shown in FIGS. 2, 4 and 6, the block 40 is partially engaged with the recess 341 and connected to one of the two ends of the bar 20 that protrudes beyond the second part 32 and includes a connection end 21. The block 40 includes a second engaging portion 41 which includes an extension section 411 facing the second part 32. The extension section 411 is smaller than the block 40 and is engaged with the recess 341. Multiple second teeth 42 are formed to the end face of the extension section 411 and are engaged with the first teeth 35 so that the block 40 is not freely rotated relative to the second clamp 30. The number of each of the first teeth 35 and the second teeth 42 can be six to eight. Each of the first and second teeth 35, 42 includes a curved face 351/421 formed to a peak thereof. As shown in FIGS. 5 and 7, the block 40 includes a hole 43 in which the connection end 21 is received so as to connect the connection end 21 to the block 40. The connection end 21 of the bar 20 is a V-shaped end, and the connection end 21 is integrally enclosed by the block 40. Preferably, the hole 43 of the block 40 is formed by way of plastic injection molding, so that the connection end 21 is integrally enclosed by the block 40.

Figure 3:
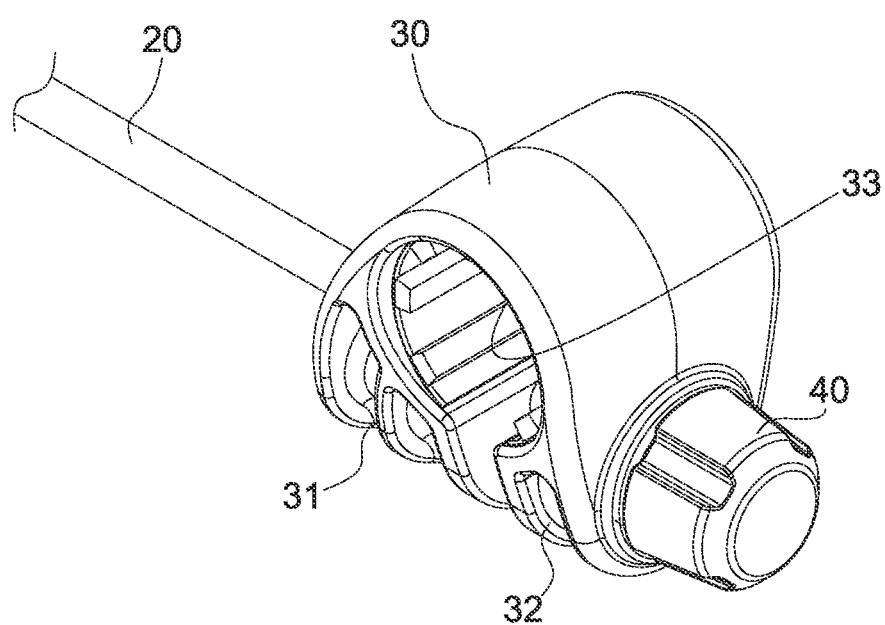
FIG. 3 is a perspective view to show the connection of the bar, the second clamp and the block of the clamping device of the present invention.

As shown in FIGS. 3, 6 and 7, the bar 20 is connected to the block 40. When in assembling, the user holds the block 40, and extends the bar 20 through the path 36, the tube 15, the spring 14 and the passage 13, and is threadedly connected to the locking member 16. The block 40 is secured by the engagement between the first and second teeth 34, 42.

As shown in FIG. 2, when rotating the locking member 16 to tighten or loosen the bar 20, because the engagement between the first and second teeth 34, 42, the bar 20 is not rotated so that the user can easily operate the locking member 16 relative to the bar 20. By the spring 14, the second clamp 30 is pushed by the first clamp 11 and the tube 15, and first and second teeth 35, 42 can be quickly engaged with each other. The curved faces 351, 421 of the first and second teeth 35, 42 allow the first teeth 35 to be engaged with the second teeth 42 even when the bar 20 is slightly rotated.

While we have shown and described the embodiment in accordance with the present invention, it should be clear to those skilled in the art that further embodiments may be made without departing from the scope of the present invention.

What is claimed is:

1. A clamping device for connecting a bicycle rack to a bicycle, comprising:
a first clamp (11), a second clamp (30) and a bar (20), two ends of the bar (20) respectively extending through the first and second clamps (11, 30), wherein the first clamp (11) includes two clamp parts (111) which are pivotably connected to each other and a passage (13) formed through the first clamp (11) for the bar (20) to extend therethrough;
the second clamp (30) being a C-shaped clamp and including a first part (31) and a second part (32) which is integrally formed to the first part (31) so as to form a C-shaped space (33) between the first and second parts (31, 32), the first part (31) including an annular groove (311) formed to the outside thereof, the second part (32) including a first engaging portion (34) formed to an outside thereof, the first engaging portion (34) including a recess (341), eight first teeth (35) circumferentially disposed on a bottom face of the recess which extend radially inward from an inner periphery of the recess (341), each of the first teeth (35) including a curved face (351) formed to a peak thereof, the bar (20) extending through the first part (31), the C-shaped space (33) and the second part (32), the second clamp (30) including a path (36) formed through the first part (31), the C-shaped space (33) and the second part (32) for the bar (20) to extend therethrough, and
a block (40) partially engaged with the recess (341) and connected to one of the two ends of the bar (20) that protrudes beyond the second part (32) and includes a connection end (21), the block (40) including a second engaging portion (41) which includes an extension section (411) facing the second part (32), the extension section (411) engaged with the recess (341) and including eight second teeth (42) circumferentially disposed on an end face of the extension section which correspond to and are engaged with the eight first teeth (35), each of the second teeth (42) including a pg,10 curved face (421) formed to a peak thereof, wherein the curved faces (351, 421) of the first and second teeth (35, 42) allow the first teeth (35) to be engaged with the second teeth (42) even when the bar (20) is slightly rotated, so that the block (40) is not freely rotated relative to the second clamp (30).

2. The clamping device as claimed in claim 1, wherein the connection end (21) of the bar (20) is a V-shaped end, the block (40) includes a hole (43) in which the connection end (21) is received.

3. The clamping device as claimed in claim 2, wherein the connection end (21) is integrally enclosed by the block (40) through plastic injection molding.

4. The clamping device as claimed in claim 1, further comprising a spring (14) located in the passage (13) of the first clamp (11), a tube (15) mounted to the bar (20) and located between the first and second clamps (11, 30) with an end piece (151) inserted into one end of the tube (15) contacting one end of the spring (14), and a locking member (16) threadedly connected to one end of the bar (20) extending beyond the first clamp (11), wherein the connection end (21) of the bar (20) is a V-shaped end integrally enclosed by the block (40), and wherein the engagement between the first and second teeth (35, 42) prevents co-rotation of the block (40) and bar (20) during operation of the locking member (16).

* * * * *